US012662986B2

(12) United States Patent
Baun et al.

(10) Patent No.: US 12,662,986 B2
(45) Date of Patent: Jun. 23, 2026

(54) WIND TURBINE WITH A NACELLE HAVING AN OFFSET CENTER OF GRAVITY

(71) Applicant: Vestas Wind Systems A/S, Aarhus N (DK)

(72) Inventors: Torben Ladegaard Baun, Skødstrup (DK); Jens Demtröder, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/561,364

(22) PCT Filed: Mar. 16, 2022

(86) PCT No.: PCT/DK2022/050049

§ 371 (c)(1),
(2) Date: Nov. 16, 2023

(87) PCT Pub. No.: WO2022/247999

PCT Pub. Date: Dec. 1, 2022

(65) Prior Publication Data

US 2024/0247637 A1 Jul. 25, 2024

(30) Foreign Application Priority Data

May 26, 2021 (DK) ............................ PA 2021 00557

(51) Int. Cl.
 *F03D 1/00* (2006.01)
(52) U.S. Cl.
 CPC .......... *F03D 1/141* (2023.08); *F05B 2240/14* (2013.01)
(58) Field of Classification Search
 CPC . F03D 1/141; F03D 80/70; F03D 1/00; F03D 80/00; F03D 1/101; F03D 80/821;
(Continued)

(56) References Cited

U.S. PATENT DOCUMENTS

2009/0148289 A1 6/2009 Edenfeld
2013/0115099 A1 5/2013 Valero Lafuente et al.
(Continued)

FOREIGN PATENT DOCUMENTS

CN 102162429 A 8/2011
CN 105794053 A 7/2016
(Continued)

OTHER PUBLICATIONS

International Searching Authority, International Seach Report and Written Opinion issued in corresponding PCT Application No. PCT/DK2022/050049, mailed on Jun. 10, 2022.
(Continued)

*Primary Examiner* — Julio C. Gonzalez
(74) *Attorney, Agent, or Firm* — Wood Herron & Evans LLP

(57) ABSTRACT

A wind turbine comprising, a tower, a nacelle mounted on the tower, and a rotor defining a rotor axis extending in a vertical center plane and configured for harvesting wind energy by rotation of blades in a rotor rotation direction about the rotor axis. The nacelle comprises a rotor-supporting assembly forming a load path from the rotor to the tower and configured for receiving rotor torque caused by the rotation of the rotor. To reduce loading of the tower and potentially provide a cheaper construction, the nacelle has a center of gravity which is offset from the center plane in a direction relative to the rotor rotation direction to counteract the rotor torque.

18 Claims, 10 Drawing Sheets

(58) Field of Classification Search
CPC ...... F03D 13/122; F03D 80/881; F03D 13/10; F03D 80/82; F03D 13/116; F05B 2240/14; F05B 2230/60; Y02E 10/72; Y02E 10/74; Y02E 10/76; Y02P 70/50
See application file for complete search history.

(56) References Cited

U.S. PATENT DOCUMENTS

| | | | | |
|---|---|---|---|---|
| 2017/0314535 | A1* | 11/2017 | Mortensen | ............. F03D 13/10 |
| 2017/0363071 | A1* | 12/2017 | Baun | ....................... F03D 15/00 |
| 2018/0363622 | A1 | 12/2018 | Baun | |

FOREIGN PATENT DOCUMENTS

| | | | |
|---|---|---|---|
| CN | 107701380 | A | 2/2018 |
| CN | 112392670 | A | 2/2021 |
| EP | 1240426 | B1 | 9/2004 |
| EP | 3276169 | A1 | 1/2018 |
| JP | 2018538484 | A | 12/2018 |
| JP | 2020528514 | A | 9/2020 |
| KR | 101559015 | B1 | 10/2015 |
| WO | 2011117005 | A2 | 9/2011 |
| WO | 2019080980 | A1 | 5/2019 |
| WO | 2021094571 | A1 | 5/2021 |

OTHER PUBLICATIONS

Danish Patent and Trademark Office, examination report issued in corresponding DK Application No. PA 2021 00557, dated Dec. 8, 2021.
Taiwan Patent Office, Search Report and Written Opinion issued in corresponding TW Application No. 11420868250, dated Aug. 19, 2025 (no translation).
European Patent Office, Notice of Opposition filed by Wobben Properties GmbH in corresponding EP Application No. 22714360.9, Feb. 17, 2026 (no translation).
European Patent Office, Notice of Opposition filed by Siemens Gamesa Renewable Energy Deutschland GmbH in corresponding EP Application No. 22714360.9, Feb. 17, 2026.
Tacke Windenergie GmbH, The Tacke Offshore Advantage, 2025OPP00010EP, Power Our Planet: TW 2.0 Offshore, May 15, 1999.
DeWind, DeWind 48 2025OPP00010EP, Description of the Turbine, Apr. 16, 1998
Japanese Patent Office, Notice of Reasons for Refusal issued in corresponding JP Application No. 2023-572816, Dec. 9, 2025.

* cited by examiner

WIND TURBINE WITH A NACELLE HAVING AN OFFSET CENTER OF GRAVITY

INTRODUCTION

The present disclosure relates to a wind turbine comprising, a tower, a nacelle mounted on the tower, and a rotor for harvesting wind energy by rotation of the rotor about a rotor axis. The nacelle comprises a rotor-supporting assembly forming a load path from the rotor to the tower, and a main bearing attached to the rotor-supporting assembly and supporting the rotation of the rotor relative to the rotor-supporting assembly.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported from the location or locations of manufacture of the individual parts to the operating site where the wind turbine is erected by road, rail or ship or a combination thereof.

Increased size leads to increased loads which must be accommodated at multiple locations of the wind turbine. Within the nacelle it is necessary to address the issue of torque-based loads, i.e. reactive loads arising from the rotor when exerting power in the powertrain. Significant reactive torque is exerted from the powertrain, in particular from the gearbox. In many designs, the torque exerted from the drivetrain is taken via torque arms onto a frame carrying the gearbox. Usually such forces are directed into the main frame where they are experienced as an asymmetric loading. The rotor supporting components must therefore be configured and dimensioned to accommodate the torque.

SUMMARY

It is an object of embodiments of the disclosure to reduce the loads, particularly the reactive loads arising from the rotor when exerting energy in the drive train. Particularly, it is an object to reduce such asymmetric loads on the tower of the wind turbine, and therefore potentially reduce the weight, size, and costs of the wind turbine, and particularly the tower part thereof. This may potentially reduce transportation and handling costs without limiting the possible size of the wind turbine. It is a further object to provide a good balance between weight distribution and modularity.

According to these and other objects, the disclosure, in a first aspect, provides a wind turbine comprising, a tower, a nacelle mounted on the tower, and a rotor defining a rotor axis extending in a vertical center plane and configured for harvesting wind energy by rotation of blades in a rotor rotation direction about the rotor axis.

The nacelle comprises a rotor-supporting assembly including a main frame, forming a load path from the rotor to the tower, and receiving a degree of torque induced by the rotation of the rotor.

The nacelle has a center of gravity (COG) which is offset from the center plane in a direction relative to the rotor rotation direction to counteract the torque induced by the rotation of the rotor.

Since the COG is offset such that it counteracts the rotor torque, this asymmetric torque-derived loading of the tower is reduced and the tower and tower interface between the tower and the nacelle, including a yaw assembly for yawing the nacelle, can optionally be smaller and cheaper.

A clockwise rotation of the rotor may be considered when seeing the rotor from the wind side. In this case, the COG should be displaced to the left side of the center plane.

If the rotor, which is unusual for a wind turbine, rotates anticlockwise, the COG should be displaced to the right side of the center plane.

The nacelle may be carried either directly by the tower or indirectly by the tower via an intermediate tower structure. If the wind turbine is of the traditional horizontal axis type, the nacelle is typically carried by a yawing arrangement between the tower top and the nacelle. The disclosure may, however, also relate to a multiple rotor wind turbine of the kind where more than one nacelle are carried by a transverse beam structure which is again carried by the tower, e.g. via a yawing arrangement between the tower and the transverse beam structure.

The disclosure may relate to an upwind wind turbine or to a downwind wind turbine.

The wind turbine could be a direct drive wind turbine with the generator typically placed outside the nacelle, or the wind turbine could be with the generator located in the main unit. The main unit supports the rotor via the rotor shaft.

The nacelle comprises a rotor-supporting assembly forming a load path from the rotor into the tower, e.g. via said intermediate tower structure, and e.g. via said yawing arrangement. The rotor-supporting assembly comprises a main frame, e.g. in the form of a casted component, e.g. a component casted in one piece.

The nacelle may additionally comprise various components for power production, hydraulic control, and computers etc.

In addition to the main frame, the rotor-supporting assembly may comprise a bearing structure and other components supporting the rotor in the wind turbine.

In a development which facilitates modularization of the turbine, the nacelle may comprise a main unit comprising the rotor-supporting assembly and a first auxiliary unit attached to the main unit and housing operative components for power conversion. With such an arrangement there are benefits for assembly in that the units may be produced in a manufacturing facility away from the location where the wind turbine is erected and the units, being only subsets of the entire nacelle may be transported more efficiently due to the smaller size and weight. On the location where the wind turbine is erected, the units can be assembled either on ground next to the tower, or on the tower.

The operative components may comprise a first transformer and a first converter, and the distance from the first converter to the center plane may be larger than the distance from the first transformer to the center plane.

The wind turbine may comprise a second auxiliary unit arranged such that the first and second auxiliary units are on opposite sides of the center plane.

The provision of major operative components which have significant weight within auxiliary units affords the opportunity for significant displacement of the resultant center of gravity as compared to conventional designs, in a manner to counteract reaction torque. The second auxiliary unit may comprise operative components for power conversion, and the operative components of the first and second auxiliary unit may be arranged asymmetrically with respect to the center plane to provide the offset of the COG away from the center plane.

The second auxiliary unit may comprise a second transformer and a second converter, and the distance from the first converter to the center plane may be larger than the distance from the second converter to the center plane. The converter thereby contributes to the shifting of the COG away from the center plane.

The nacelle may be rotationally connected to the wind turbine tower for rotation about a yaw axis extending in a vertical transverse plane perpendicular to the vertical center plane. In this embodiment, the transverse plane may be between the COG and the rotor, i.e. the COG is behind the vertical yaw axis when viewed in the direction of the wind.

A first of the operative components for power conversion, particularly a transformer, may be attached to the rotor-supporting assembly such a first center of gravity, herein referred to as 1st-COG, of the first component is upwind relative to COG. Upwind means in the direction of the wind when the rotor is positioned in the operational position up against the wind.

A second of the operative components for power conversion, particularly a converter, may be attached to the rotor-supporting assembly such that a second center of gravity, herein referred to as, 2nd-COG, of the second component is downwind relative to the COG, downwind means in the direction away from the wind when the rotor is positioned in the operational position up against the wind.

The rotor-supporting assembly may comprise a main frame and a main bearing housing attached to the main frame, the main bearing housing comprising a main bearing for rotational suspension of a rotor shaft relative to the main frame.

The main bearing housing may form part of a load path from the nacelle to the tower, and particularly from the first of the operative components.

The displacement of the COG away from the center plane may be caused by a load component, e.g. the first operative components for power conversion, being attached directly to the rotor-supporting assembly, e.g. attached directly to the main frame.

The displacement of the COG away from the center plane may be caused by a load component, e.g. the second operative components for power conversion, being attached indirectly to the rotor-supporting assembly e.g. via the auxiliary unit and main unit to the main frame.

Examples of a main unit and/or an auxiliary unit include units of any size and shape and configured to be assembled.

The auxiliary and/or the main unit may be formed with size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced when the main and/or auxiliary unit is a shipping freight container. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

The main unit and the auxiliary unit may be arranged side by side such that the auxiliary units are separated by the center plane in a direction away from a rotational axis defined by the rotor-supporting assembly as opposed to one after the other in the direction of the rotational axis.

Each of the two auxiliary units may have half the size of one shipping freight container following the dimensions and structural specifications in the ISO standard of ISO 668: 2013 for series 1 freight containers, and arranged such that the two half parts of the container can be assembled to form one container during transport, and split into two auxiliary units to be arranged e.g. on opposite sides of the main unit. The container may particularly be split in an interface extending in the longitudinal direction of the container, i.e. the longest dimension of the container.

BRIEF DESCRIPTION OF DRAWINGS

In the following, embodiments will be described with reference to the drawing in which.

DETAILED DESCRIPTION

The detailed description and specific examples, while indicating embodiments, are given by way of illustration only, since various changes and modifications within the spirit and scope of this disclosure will become apparent to those skilled in the art from this detailed description.

Figure 1A:
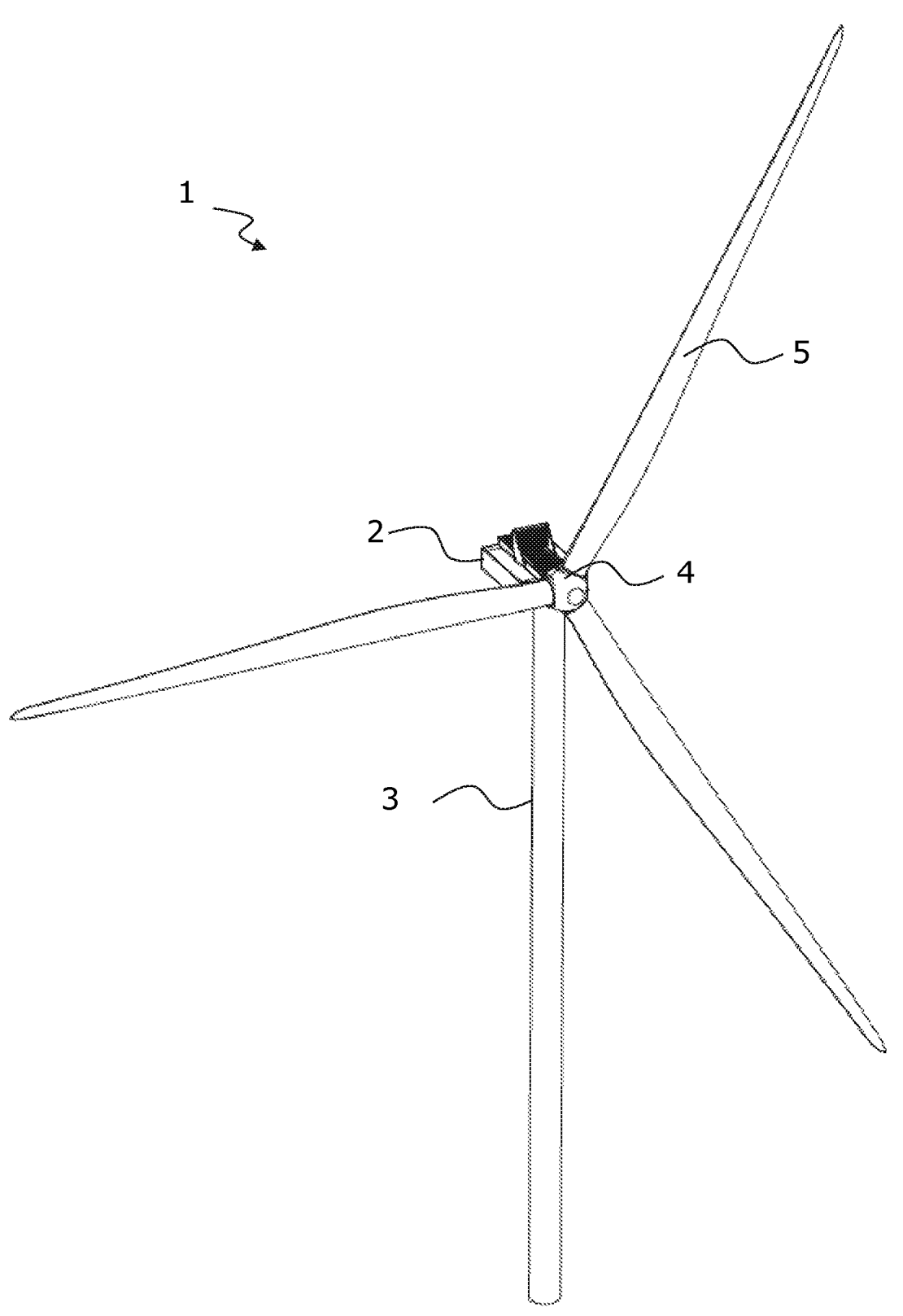
FIGS. 1a, 1b, and 1c illustrate wind turbines with a nacelle mounted on a tower.
Figures 1B, 1C:
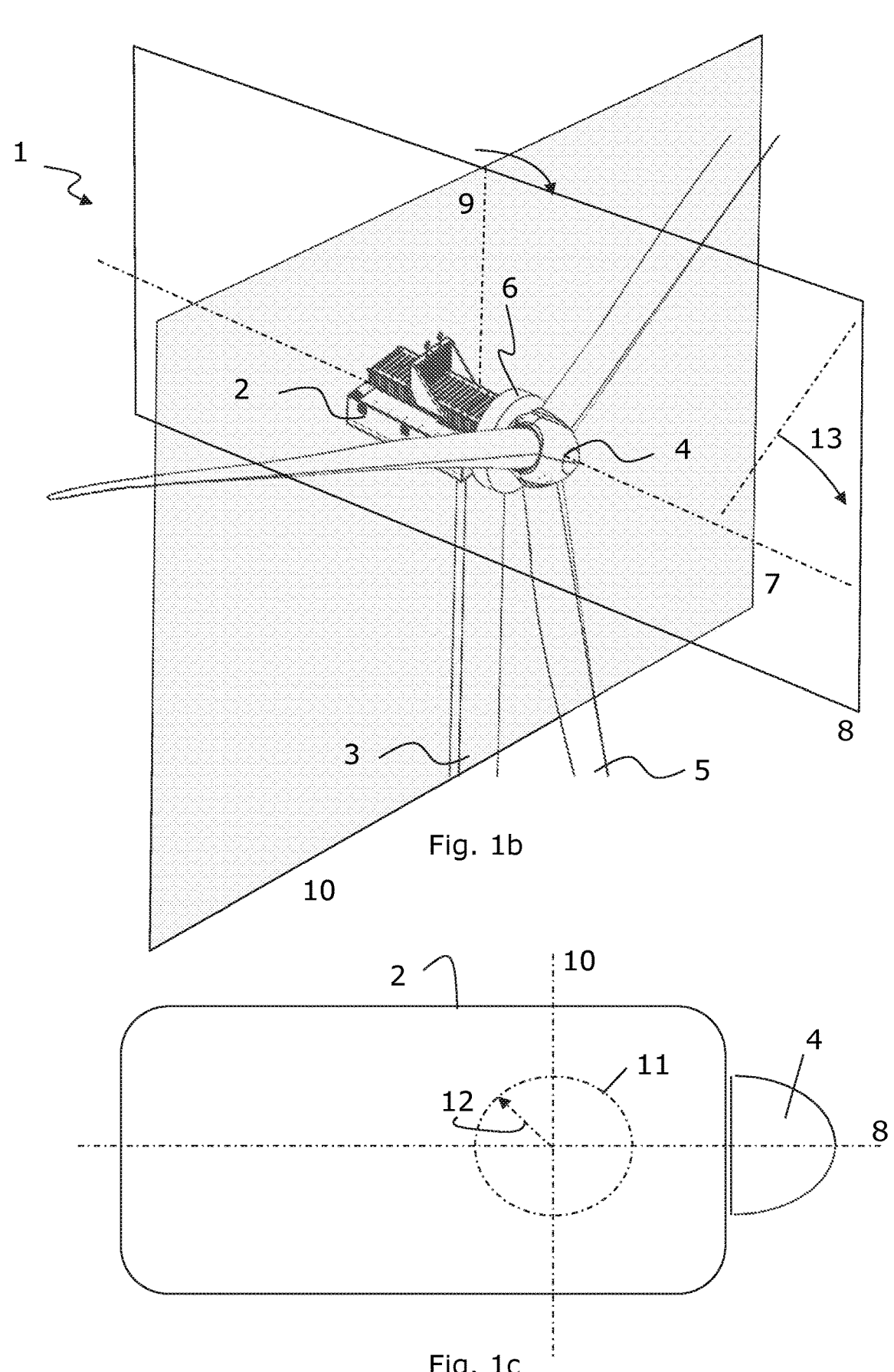

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle. The rotor-supporting assembly further comprises a main frame and main bearing in a main bearing housing connected to the main frame.

When the rotor rotates, energy is dissipated in the drive train, inter alia as losses in bearings, and losses in an optional gearbox, and as energy transferred to a generator for conversion to electrical energy. In response to the dissipated energy, the rotor-supporting assembly must counteract torque arising from the rotor exerting power in the drive train. This reactive torque is experienced as loading directed from the rotor-supporting assembly into the tower.

By definition herein, the rotor rotates about a rotor axis 7. A vertical center plane 8 which bisects longitudinally the wind nacelle 2 can be defined with the rotor axis extending in this plane. To direct the rotor upwind against the wind, the nacelle 2 is rotatable about a vertical yaw axis 9. A transverse plane 10 extending laterally can be defined, with the yaw axis extending within this transverse plane 10. The transverse plane 10 is perpendicular to the center plane. The yaw axis 9 extends both in the transverse plane 10 and in the center plane 8.

FIG. 1*c* illustrates the center plane and the transverse plane when the nacelle is seen from above. The tower is indicated by the circle 11 and has a radial dimension indicated by the arrow 12.

Figures 2, 3:
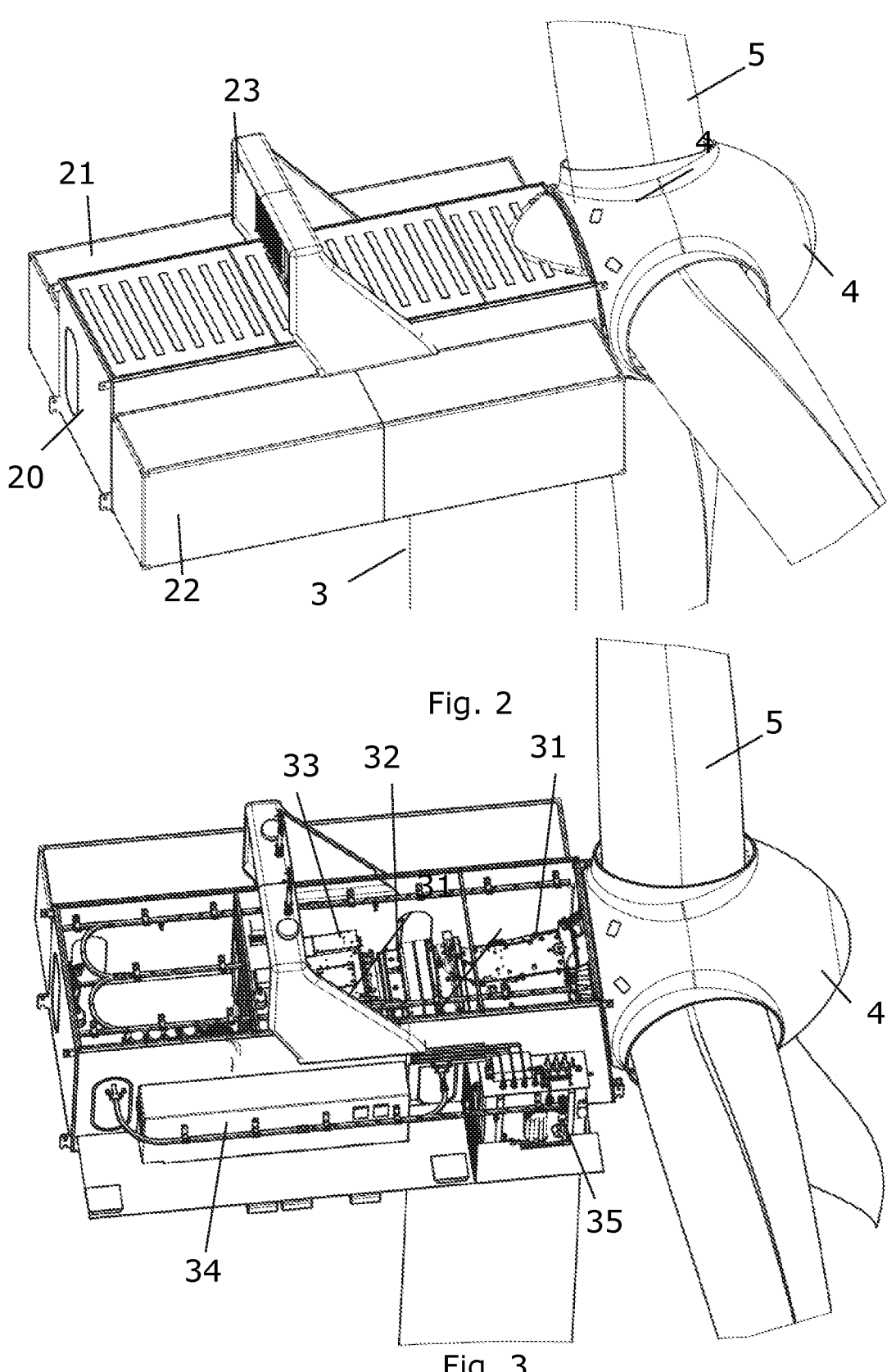
FIG. 2 illustrates a nacelle comprising a main unit and two auxiliary units.
FIG. 3 illustrates a perspective view of the nacelle.

FIG. 2 illustrates a nacelle having a modular construction in which certain operative components are provided within separate modules. More particularly, the nacelle comprises a main unit 20 and two auxiliary units 21, 22. The auxiliary units may be separately assembled and transported and fitted on the main units. A cooling area 23 is arranged on top of the nacelle. The cooling area is formed by a heat exchanger which may form part of the main unit, and/or any of the auxiliary units. The main unit 20 is mounted on the tower 3 via a rotor-supporting assembly and a yawing arrangement (not shown). The yaw assembly allows the nacelle 2 to rotate about the yaw axis to direct the rotor into the wind.

FIG. 3 illustrates a perspective view of the nacelle 2 of FIG. 2. In FIG. 3 the outer walls of the nacelle 2 are (for the sake of explanation) transparent, thereby revealing the interior parts of the nacelle 2 and the wind turbine components accommodated therein. The main unit 20 accommodates a rotor-supporting assembly supporting the rotor. The rotor-supporting assembly comprises inter alia a main frame, and a main bearing 31 attached to the main frame to facilitate rotation of the rotor.

The disclosed wind turbine further comprises a gear arrangement 32 and a generator 33, arranged sequentially behind the hub 4, along a direction defined by the rotational axis of the rotor. The components in the main unit primarily form part of the drivetrain. In alternative embodiments, the generator is arranged outside the nacelle as illustrated in FIG. 1*b*.

The auxiliary unit 22 accommodates major components which form part of the power conversion system, more particularly a converter unit 34, and a transformer unit 35. In alternative embodiments, the auxiliary unit 22 accommodates e.g. an electrolysis cell stack or a battery etc. The other auxiliary unit, 21, is attached to main unit on an opposite side of the center plane and may contain similar operative components or other components, e.g. a crane etc. In the following, such components are referred to as operative components.

The operative components are chosen and placed such that the center of gravity (COG) of the complete nacelle is offset from the center plane in a direction relative to the rotor rotation direction to counteract and optionally to eliminate the received torque.

Figures 4, 5:
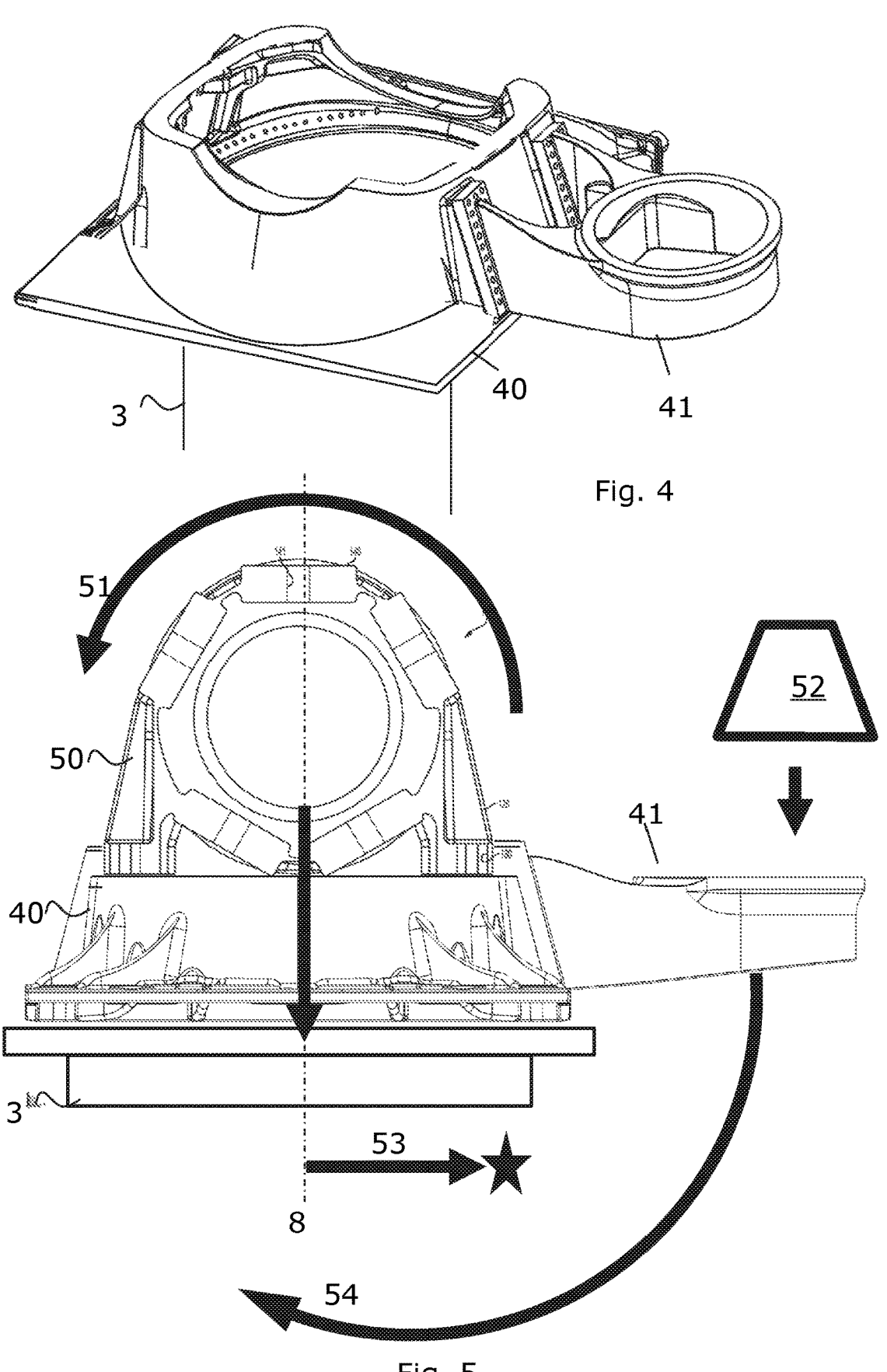
FIG. 4 illustrates a part of the rotor-supporting assembly, i.e. the main frame formed as a single piece, casted, component.
FIG. 5 illustrates the rotor-supporting assembly seen from an end of the rotor shaft.

FIG. 4 illustrates a main frame 40 formed as a single piece, casted, component. The main frame further comprises an assembly structure 41 bolted directly to the casted component. The rotor-supporting assembly forms a part of the nacelle and defines a load path from the rotor to the tower 3. In the embodiment of FIGS. 1 and 2, the rotor-supporting assembly is typically located in the main unit 20.

FIG. 5 illustrates the rotor-supporting assembly seen from the nacelle rear facing in an upwind direction towards the rotor. A main bearing housing 50 is attached to the main frame 40. The main bearing allows the rotor to rotate relative to the main frame. The arrow 51 indicates a torque experienced by the rotor supporting assembly.

FIG. 5 shows schematically a load component 52 is arranged on the assembly structure 41 which serves to shifts the center of gravity of the nacelle (COG) away from the center plane 8 as illustrated by the arrow 53. The COG not being in the center plane, counteracts the experienced torque 51 caused by the rotation of the rotor. The counteracting torque provided by the shifted COG is illustrated by the arrow 54. As discussed below the load component is a major operative component having a significant weight, e.g. a transformer. In current latest-generation designs of 10-15 MW rating the transformer has a weight of multiple tonnes, even up to 20 tonnes, and its positioning therefore has significant impact on the position of COG.

The main bearing housing, when attached to the main frame, forms part of a load path from the load component 52 to the nacelle and to the tower.

Figure 6:
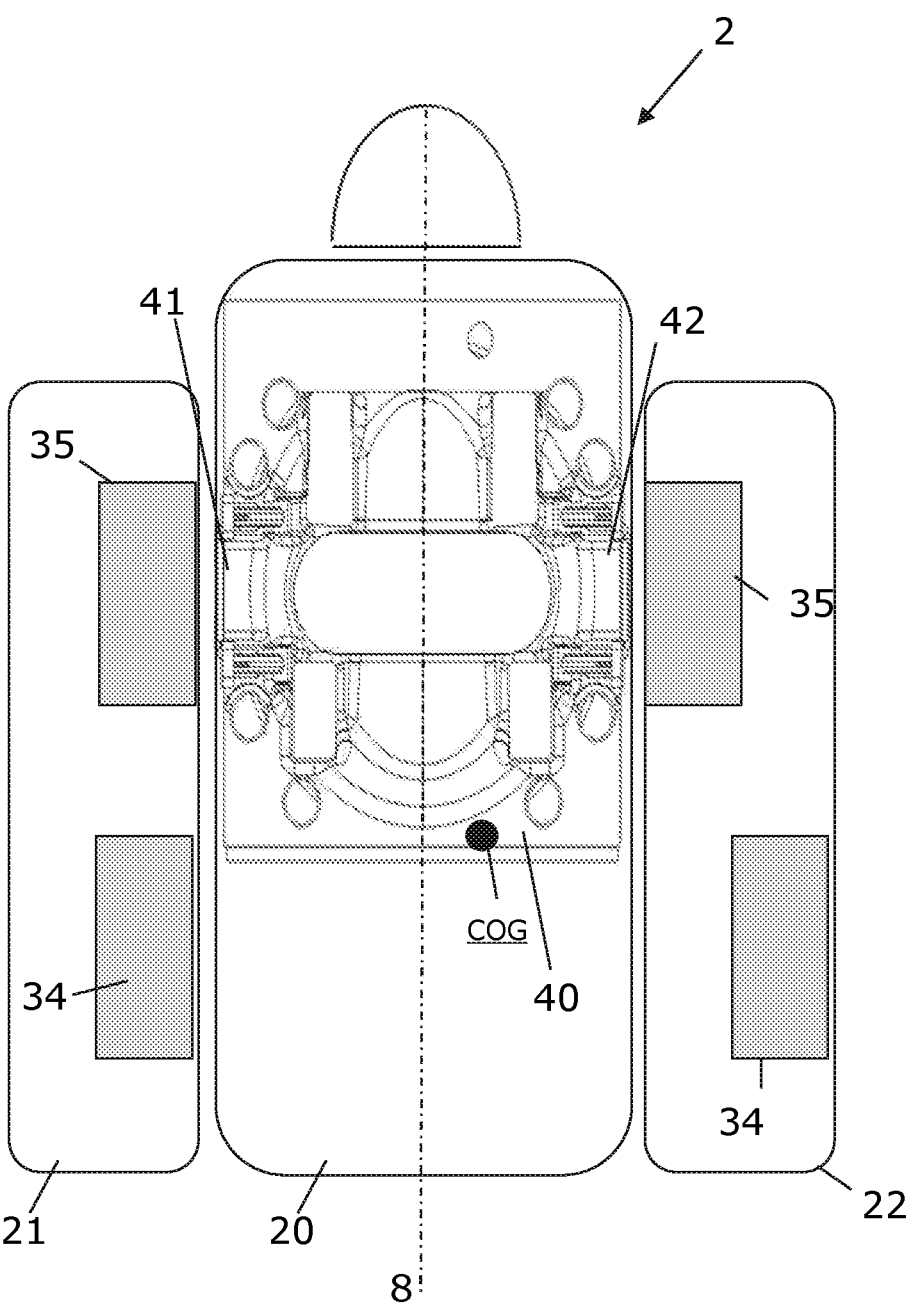
FIGS. 6-7 illustrate different embodiments of the nacelle seen from above.

FIG. 6 illustrates the nacelle 2 seen from above. The main unit 20 contains the rotor-supporting assembly 40, and the auxiliary units 21, 22 each contains a converter 34 and a transformer 35.

The main frame 40 includes a pair of assembly structures 41, 42 on opposite sides of the main frame 40. The operative components, in this example in the form of transformers 35, are attached directly to main frame. The main frame is fixed to the tower via a yaw assembly allowing rotation about the yaw axis. The main frame thereby defines a load path extending directly from the operative components 35 through the main frame to the tower.

The other operative components 34 are attached indirectly to the rotor-supporting assembly via the auxiliary units. The second operative components are e.g. attached to the floor or a wall of the auxiliary unit, and the auxiliary unit is attached to the main unit. The auxiliary unit, and the main unit thereby define a load path from the second operative components through the auxiliary unit to the rotor-supporting assembly and to the tower.

FIG. 6 illustrates that the operative components 35, in this case the transformers 35, are located with the same distance to the center plane 8, and the second operative components, in this case exemplified by the converters 34, are located with different distance to the center plane. This provides shifting of the COG away from the center plane 8 and thereby counteracts the experienced torque.

An optimal counteracting can be obtained by different combinations of locations. The transformer is typically heavier than the converter (although a converter also has significant weight of several tonnes, even up to 15 tonnes), and a slight displacement of the transformers 35 may have a larger impact than comparably large displacements of the converters 34.

Figure 7:
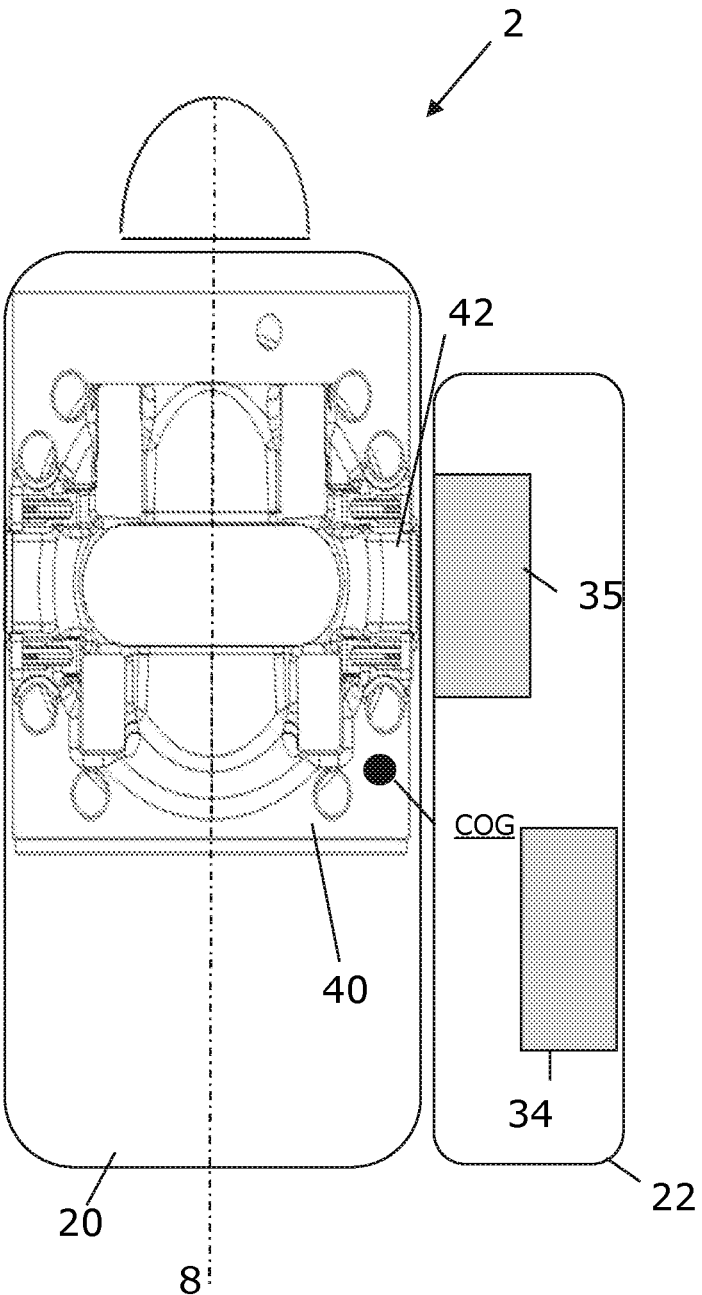

FIG. 7 illustrates another example in which only one auxiliary unit is placed on one side of the center plane 8 and the entire mass of the auxiliary unit therefore shifts the COG of the nacelle very significantly away from the center plane and counteracts the experienced torque.

Figure 8:
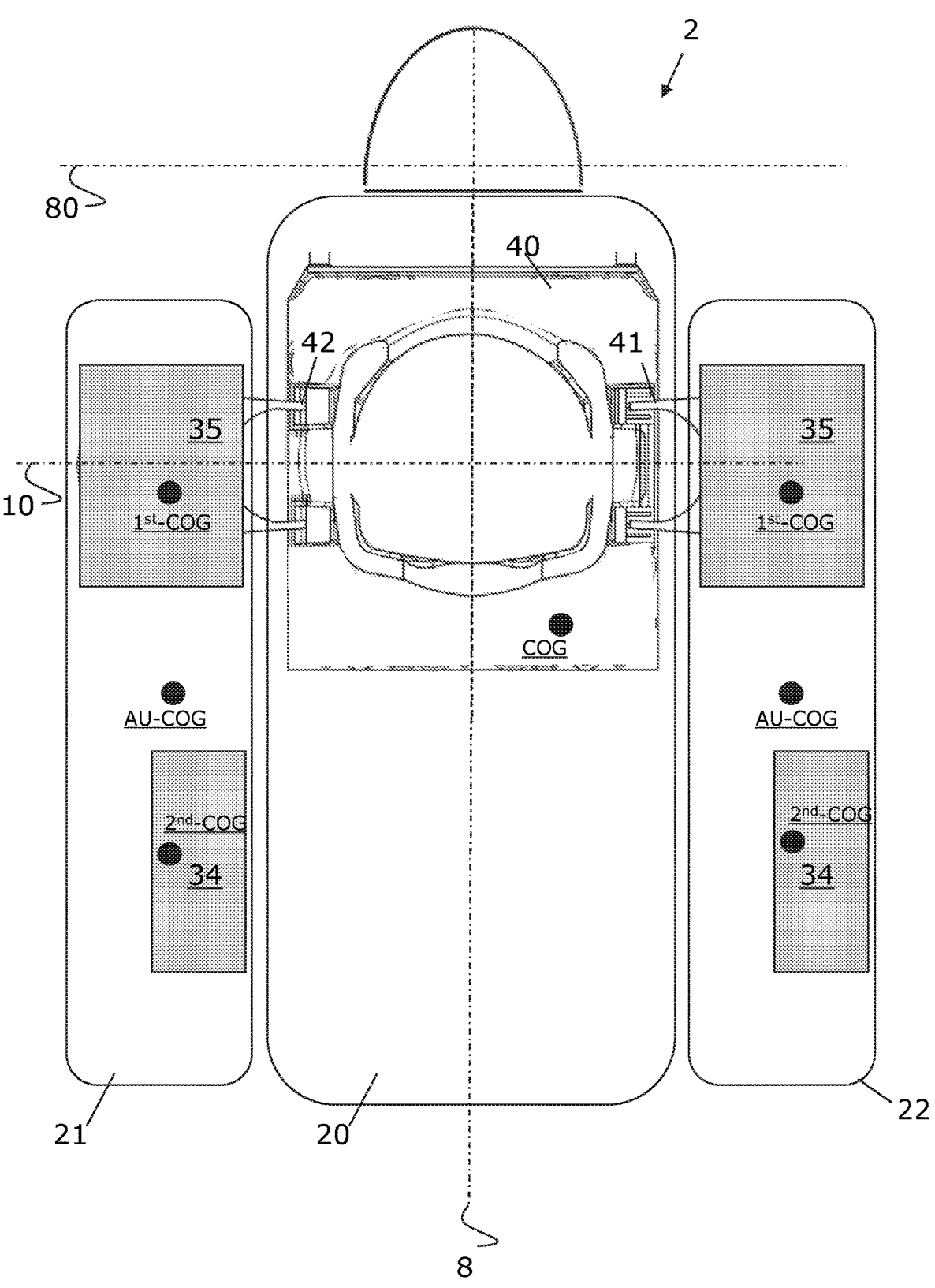
FIG. 8 illustrates details related to the center of gravity of different components.

FIG. 8 illustrates a nacelle with the single piece, casted, main frame in FIG. 4. The first operative components 35 are attached directly to the rotor-supporting assembly with a center of gravity of the first operative component marked as 1st-COG. This 1st-COG is located close to the transverse plane 10. By movement of one of the first operative components, or by selecting the first operative components with different weight, the displacement of the COG away from the center plane may be caused by a load component in the form of the first operative component attached directly to the rotor-supporting assembly.

The second operative components 34 are placed on the floor of the auxiliary units and therefore only indirectly attached to the rotor-supporting assembly via the connection between the auxiliary unit and the main unit. The center of gravity of the second operative components are marked as 2nd-COG. This 2nd-COG is located further away from the transverse plane 10. By different locations of the second operative components, displacement of the COG away from the center plane may be caused by a load component attached indirectly to the rotor-supporting assembly.

The auxiliary units have centers of gravity marked in the drawing as AU-COG. A distance from the rotor plane 80 to the AU-COG is larger than a distance from the rotor plane to the 1st-COG.

1st-COG of the first component is upwind relative to COG, and 2nd-COG of the second component is downwind relative to the COG.

Figure 9A:
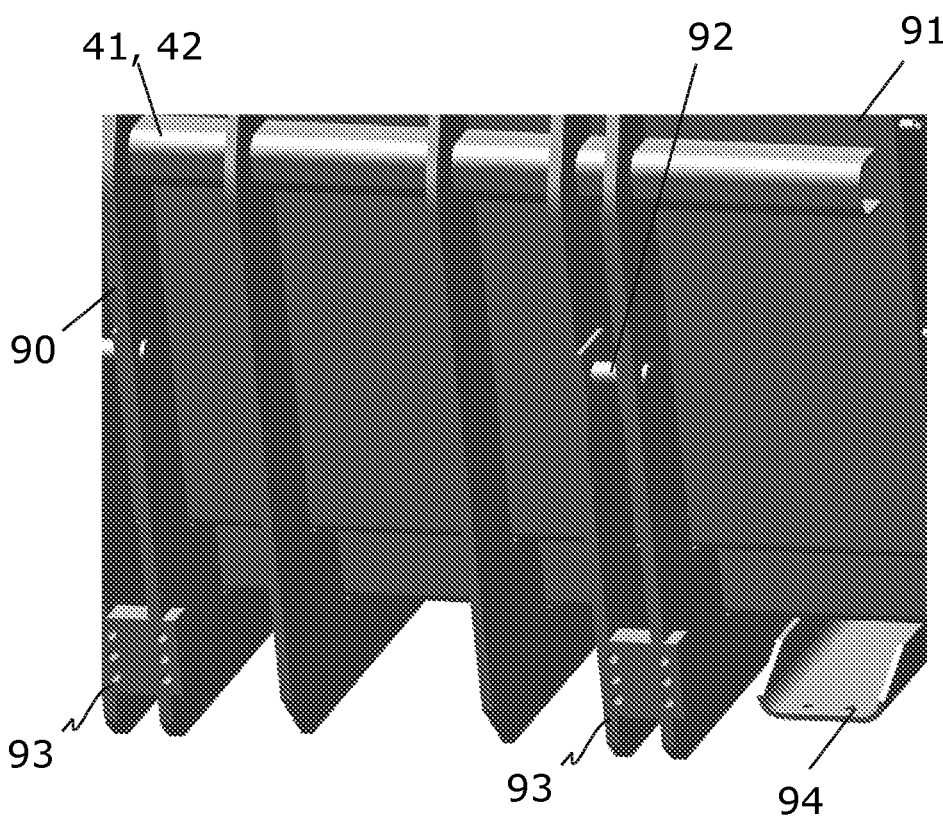
FIGS. 9a, 9b, and 10 illustrate different interfaces between an operative component and the main frame.

FIG. 9a illustrates another assembly structure connecting the main frame to an operative component. In the illustrated embodiment, the assembly structure 90 connects the transformer 91 to the main frame. In an upper end of the assembly structure, the transverse pins 92 can be suspended on the main frame, and in the lower end of the assembly structure, the assembly structure may be bolted onto the main frame via the holes 93. The assembly structure further includes a lower support structure 94 on which the transformer can be carried on the floor of the nacelle, e.g. until final assembly and attachment to the main frame. Particularly, the transformer can be placed on the floor of an auxiliary unit and be bolted onto the main frame once the auxiliary unit is attached to the main unit.

Figure 9B:
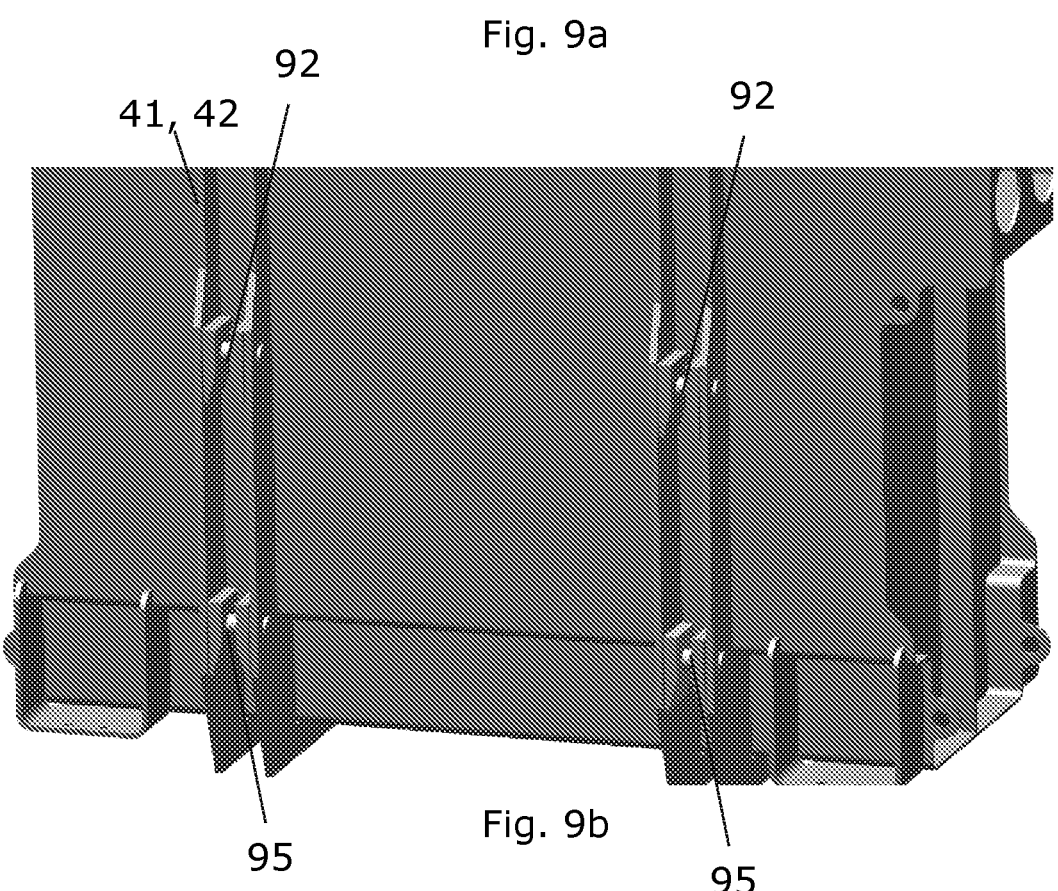

FIG. 9b illustrates an alternative assembly structure in which both the upper end and lower end comprises pins 92, 95 to be suspended on the main frame.

Figures 10, 11:
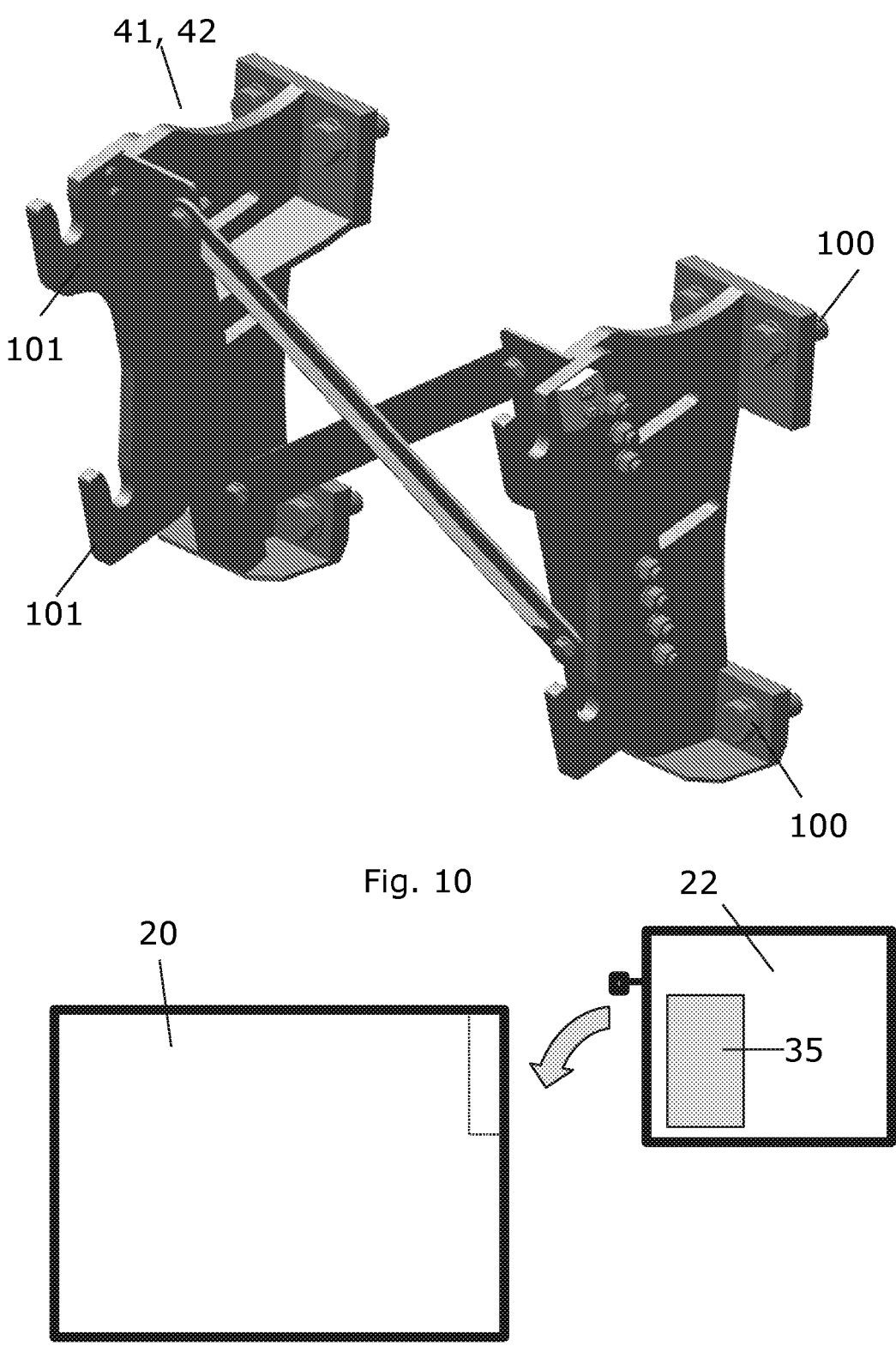
FIG. 11 illustrates that the main unit and the auxiliary unit are separate units.

FIG. 10 illustrates an alternative assembly structure in which both the upper end and lower end of one side comprises bolt structures 100 to engage the main frame, and both the upper and lower end of the other side of the assembly structure forms a hook structure 101 for suspension of the operative component.

FIG. 11 illustrates schematically that the main unit and the auxiliary unit are separate units being assembled either before the nacelle is mounted on the tower or after the nacelle is mounted on the tower. The reference numbers refer also to the wind turbine in FIG. 3.

FIGS. 12-15 illustrate four different embodiments of the unit fixation structure forming the interfaces between the main unit and the auxiliary unit. In each of these four illustrations, the main unit 121 and the auxiliary unit 122 are connected by cooperating structures forming the unit fixation structure and being described in further details below.

Figure 12:
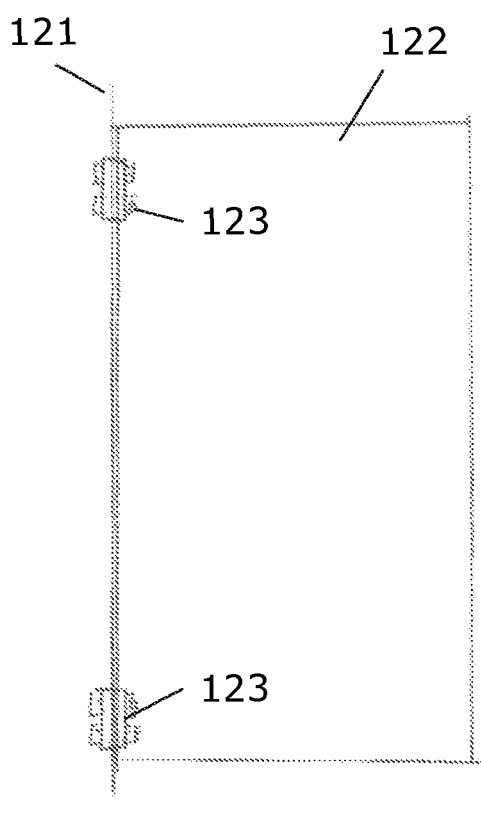
FIGS. 12-15 illustrate different interfaces between the main unit and the auxiliary unit.

In FIG. 12, the cooperating structures are constituted by brackets 123 by which the main and auxiliary units are joined by bolts.

Figure 13:
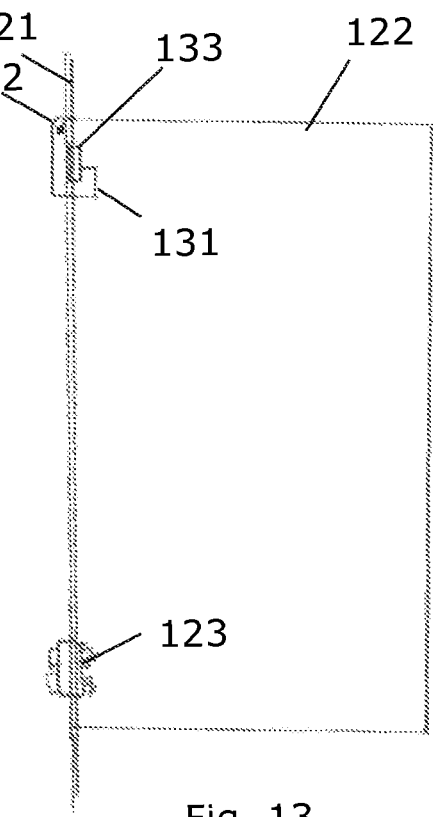

In FIG. 13, the cooperating structures are constituted by a lower bracket 123 like the one used in FIG. 12. At the upper edge, the main unit and auxiliary unit are assembled by a hook 131 pivotally joined to the main unit at the hinge point 132. The hook can rotate as indicated by the arrow 133 and engages the edge-bracket 134 of the auxiliary unit when in the illustrated position. When the lower bracket 123 is removed, and the hook 131 is rotated into the main unit, the auxiliary unit can be lowered to the ground.

Figure 14:
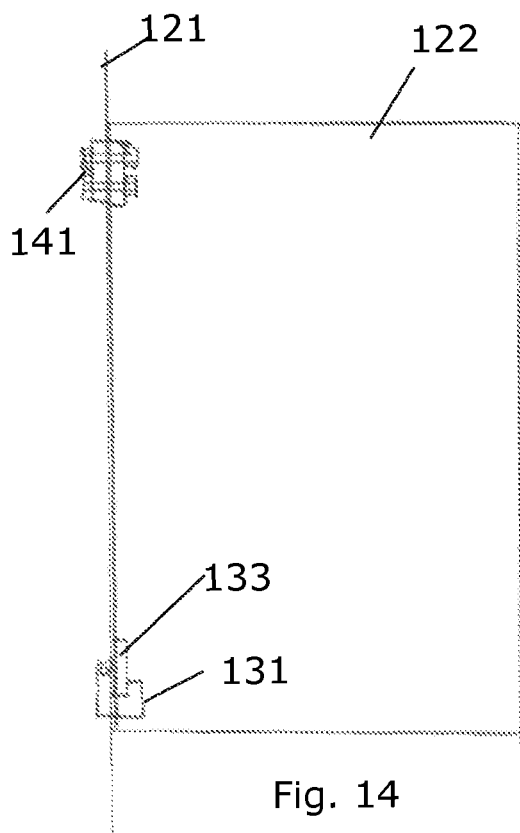

The embodiment in FIG. 14 is comparable to the embodiment in FIG. 13, but where the lower bracket is replaced with an upper bracket 141, and the hook is placed at a lower edge.

Figure 15:
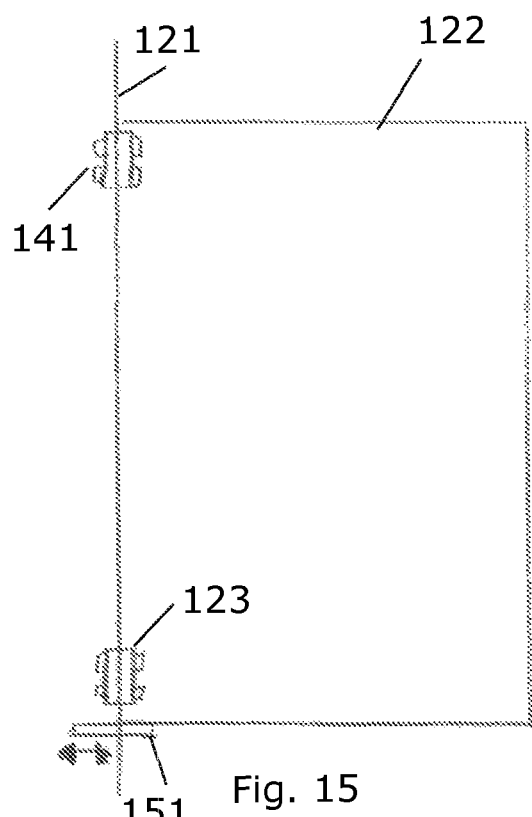

In FIG. 15, a lower and an upper bracket is used for bolting the auxiliary unit to the main unit, and a slidable support 151 supports the lower surface of the auxiliary unit while the bolts are attached. If it is desired to lower the auxiliary unit to the ground, e.g. for replacement or maintenance of the operative component, the slidable support can be slid to the left and the auxiliary unit can be lowered down, e.g. by use of a crane build into the main unit.

In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower. Accordingly, the auxiliary unit is connected to the tower indirectly via the main unit.

In addition to the hook and bracket unit fixation structure illustrated in FIGS. 12-15, an assembly structure (shown e.g. in FIGS. 4, 8, 9, and 10) connects an operative component, e.g. a transformer, directly to the main frame inside the main unit.

The main unit and the auxiliary units may be joined after the operative component is placed in the auxiliary unit, e.g. after a transformer is placed in the auxiliary unit. The operative component may e.g. be placed on the floor of the auxiliary unit, and when the auxiliary unit is fixed to the main unit, it may be desired that the weight of the operative component is carried mainly or completely by the main frame in the main unit.

In the assembly procedure, the load from the operative component is transferred from the auxiliary unit, e.g. from the floor of the auxiliary unit to the main frame. This load transfer may occur during or after the auxiliary unit is attached to the main unit.

In one procedure, the operative component is gripped by the assembly structure while the auxiliary unit is lowered into the position where it is fixed to the main unit. When reaching the assembled position of the auxiliary unit, the load is transferred from the auxiliary unit to the main unit, and particularly to the main frame in the main unit.

In an alternative procedure, the auxiliary unit is lowered into the position where it is fixed to the main unit. Subsequently, i.e. when reaching the assembled position of the auxiliary unit, the load is transferred from the auxiliary unit to the main unit. This may e.g. include that the operative component is fixed to the assembly structure and optionally, that a support between the operative component and the floor of the auxiliary unit is removed or lowered to thereby allow the entire load to be transferred to the main frame.

In another alternative procedure, the auxiliary unit is held at an inclined angle relative to horizontal while being lowered into place. When a first end of the auxiliary unit reaches the correct level, it is fixed to the main unit. The operative component is placed in the opposite, second, end of the auxiliary unit, and at the point in time where the first end is being joined to the main unit, the operative component it is still carried by the auxiliary unit, e.g. on the floor of the auxiliary unit. When the first end is fixed, the second end is lowered, and the operative component is gripped by the assembly structure. During continued lowering of the second end, the weight of the operative component is transferred from the auxiliary unit to the main frame, and finally, the second end of the auxiliary unit is attached to the main unit.

In another alternative procedure, the auxiliary unit is lowered into the position where it is fixed to the main unit. During the lowering of the auxiliary unit, the operative component is gripped by the assembly structure and the lifting force from the crane is simultaneously adjusted for adapting to the changed balance when the operative component is gripped. When reaching the assembled position of the auxiliary unit, the load is transferred from the auxiliary unit to the main unit, and due to the dynamic adjusting of the lifting force, i.e. the adjusting while lowering the auxiliary unit, the balance is preserved.

The invention claimed is:

1. A wind turbine comprising, a tower, a nacelle mounted on the tower, and a rotor defining a rotor axis extending in a vertical center plane and configured for harvesting wind energy by rotation of blades in a rotor rotation direction about the rotor axis, the nacelle comprising:

a rotor-supporting assembly including a main frame, forming a load path from the rotor to the tower, and receiving a degree of torque induced by the rotation of the rotor, wherein the nacelle has a center of gravity (COG) which is offset from the center plane in a direction relative to the rotor rotation direction to counteract the torque induced by the rotation of the rotor, and wherein one or more operative components forming part of a power conversion system of the wind turbine are arranged to offset the COG from the center plane.

2. The wind turbine according to claim 1, wherein the rotor rotation direction is clockwise when seen from a wind side of the rotor, and wherein the COG is offset to a left side of the center plane.

3. The wind turbine according to claim 1, wherein the operative components comprise a transformer and/or a converter.

4. The wind turbine according to claim 1, wherein the nacelle comprises a main unit comprising the rotor-supporting assembly and a first auxiliary unit attached to the main unit and housing one or more operative components.

5. The wind turbine according to claim 4, wherein the first auxiliary unit houses a first transformer and a first converter.

6. The wind turbine according to claim 5, wherein a distance from the first converter to the center plane is larger than a distance from the first transformer to the center plane.

7. The wind turbine according to claim 5, comprising a second auxiliary unit, the first and second auxiliary units being attached to the main unit on opposite sides of the center plane.

8. The wind turbine according to claim 7, wherein the second auxiliary unit houses operative components, and wherein the operative components of the first and second auxiliary units are arranged asymmetrically with respect to the center plane.

9. The wind turbine according to claim 7, wherein the second auxiliary unit houses a second transformer and a second converter, and, wherein the distance from the first converter to the center plane is larger than the distance from the second converter to the center plane.

10. The wind turbine according to claim 1, wherein the nacelle is rotationally connected to the wind turbine tower for rotation about a yaw axis extending in a vertical transverse plane perpendicular to the vertical center plane, and wherein the transverse plane is between the COG and the rotor.

11. The wind turbine according to claim 1, wherein a first of the operative components for power conversion is attached to the rotor-supporting assembly such that a first center of gravity ($1^{st}$-COG) of the first component is upwind relative to the nacelle COG.

12. The wind turbine according to claim 11, wherein a second of the operative components for power conversion is attached to the rotor-supporting assembly such that a second center of gravity ($2^{nd}$-COG) of the second component is downwind relative to the nacelle COG.

13. The wind turbine according to claim 1, wherein the rotor-supporting assembly comprises a main frame and a main bearing housing attached to the main frame, the main bearing housing comprising a main bearing for rotational suspension of a rotor shaft relative to the main frame, and wherein the main bearing housing forms part of a load path from the operative component to the tower.

14. The wind turbine according to claim 1, wherein the operative component is attached directly to the rotor-supporting assembly.

15. The wind turbine according to claim 1, wherein the operative component is attached indirectly to the rotor-supporting assembly.

16. A wind turbine comprising, a tower, a nacelle mounted on the tower, and a rotor defining a rotor axis extending in a vertical center plane and configured for harvesting wind energy by rotation of blades in a rotor rotation direction about the rotor axis, the nacelle comprising:

a rotor-supporting assembly including a main frame, forming a load path from the rotor to the tower, and receiving a degree of torque induced by the rotation of the rotor, and a first operative component and a second operative component of the wind turbine, wherein the nacelle has a center of gravity (COG), and wherein a distance from the first operative component to the center plane is larger than a distance from the second operative component to the center plane to offset the COG in a direction relative to the rotor rotation direction to counteract the reaction torque induced by the rotation of the rotor.

17. The wind turbine according to claim 16, wherein the first operative component comprises either a transformer or a converter, and the second operative component comprises the other of the transformer and the converter.

18. A method of constructing a wind turbine having a tower, a nacelle mounted on the tower, and a rotor defining a rotor axis extending in a vertical center plane and configured for harvesting wind energy by rotation of blades in a rotor rotation direction about the rotor axis, the nacelle comprising a center of gravity (COG) and a rotor-supporting assembly including a main frame that forms a load path from the rotor to the tower and receives a degree of torque induced by the rotation of the rotor, the method comprising:

arranging an operative component that forms part of a power conversion system of the wind turbine within the nacelle to offset the center of gravity (COG) from the center plane in a direction relative to the rotor rotation direction, and selecting the offset in the COG of the nacelle to counteract torque generated by rotation of the rotor during operation of the wind turbine.

* * * * *